United States Patent

[11] 3,602,153

| [72] | Inventor | Gerhard Korn<br>Muelheim-Ruhr, Germany |
| --- | --- | --- |
| [21] | Appl. No. | 8,642 |
| [22] | Filed | Feb. 4, 1970 |
| [45] | Patented | Aug. 31, 1971 |
| [73] | Assignee | Rheinstahl Huttenwerke AG<br>Essen, Germany |
| [32] | Priority | Feb. 19, 1969 |
| [33] | | Germany |
| [31] | | P 19 08 176.6 |

[54] RESILIENTLY CONNECTED WHEEL DRIVE SET
7 Claims, 2 Drawing Figs.

[52] U.S. Cl. .................................................... 105/131,
105/117, 105/136
[51] Int. Cl. ........................................................... B61c 9/44,
B61c 9/48, B61c 9/52
[50] Field of Search ............................................ 105/131,
117, 131, 136

[56] References Cited
UNITED STATES PATENTS

| 568,779 | 10/1896 | Lockwood.................... | 105/131 X |
| 2,058,630 | 10/1936 | Rice............................. | 105/131 |
| 2,404,115 | 7/1946 | Williams....................... | 105/131 |

Primary Examiner—Arthur L. La Point
Assistant Examiner—Howard Beltran
Attorney—Michael S. Striker ABSTRACT: A drive bogie has a motor driving hollow front and rear shafts through which front and rear wheel shafts pass. To the ends of the hollow shafts are connected the end portions of the respective wheel shafts by elastic coupling means having matching concave and convex coupling members connected by an elastic member which is radially compressed during relative movement of the hollow shaft and wheel shaft caused by the weight of the motor.

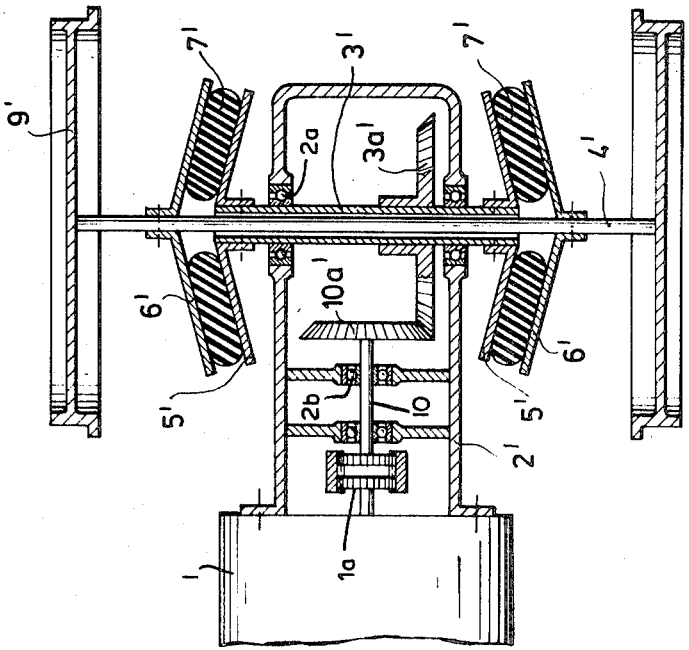
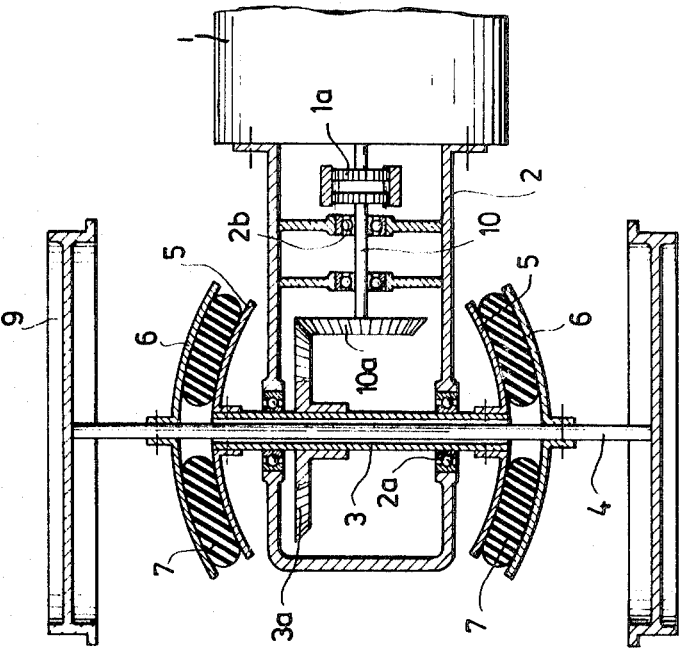

RESILIENTLY CONNECTED WHEEL DRIVE SET

BACKGROUND OF THE INVENTION

The present invention relates to a drive bogie with two wheel sets as used for railroads, particularly for streetcars.

Double wheel set drive bogies with an electromotor whose axis extends in longitudinal direction are known in which the wheel shafts pass through hollow shafts driven by the motor, and are connected with the same elastic coupling means, which include an elastic rubber member. In this construction, the motor rests with supporting means carrying an angular transmission, on the wheel shafts, bridging the same. The elastic coupling means are formed by two planar parallel coupling discs which are connected by annular rubber bodies vulcanized to the confronting planar faces of the discs. The elastic coupling means have not only to transfer and sustain the reaction moment of the motor, but also the weight of the motor and the transmissions carried by the supporting means of the motor. In this apparatus according to the prior art, the rubber of the elastic coupling means is subjected to shearing stress by the weight of the motor and connected transmissions. Since rubber, and other elastomers, are soft and little resistant to shearing forces, the hollow shafts, together with the motor and transmissions, sag relative to the center portions of the wheel set shafts. Due to recoil of the rubber, oscillations occur at high speeds, which detrimentally influence the quiet operation of the drive bogie.

Furthermore, the elastic couplings are subjected to pressure on one side only when the wheels move over obstacles, are derailed, or engage with the wheel flanges the rail top, which causes relative angular displacement of the wheel sets and of the wheel shafts relative to the hollow shafts. The one-sided pressure on the elastic coupling means, also causes an increase of the forces acting on the bearings supporting the hollow shafts so that the span of life of the bearings is detrimentally affected.

SUMMARY OF THE INVENTION

It is one object of the invention to overcome the disadvantages of prior art constructions of this type, and to provide a wheel set drive in which the elastic couplings function more efficiently, are subjected to less wear, and have a longer span of life.

Another object of the invention is to construct the elastic coupling means in such a manner that vertical weight forces transverse to the axes of the shafts, subject the elastic members of the coupling means to compression rather than to shearing stresses.

With these objects in view, the outer coupling members which are carried by each wheel shaft, have a dished concave shape toward the coupling members which are carried by the ends of the hollow shaft. Preferably, the last-mentioned coupling members are convex toward the outer coupling members which are carried by wheel shafts. Preferably, the concave and convex surfaces of the coupling members of the same elastic coupling means match each other so that the elastic member connecting the same is of substantially constant thickness. The coupling members may be curved, or have frustoconical shape.

Since the elastic members are sustained in the hollow of the concave outer coupling members, they are radially compressed by the weight of the motor, and are not subjected only to shearing forces. This arrangement has a centering effect on the inner convex coupling member, and thereby on the respective hollow shaft carrying the inner coupling members so that a sagging of the motor, transmissions, and hollow shaft is substantially avoided. On the other hand, if relative angular displacement between the wheel shafts and the respective hollow shafts occur, the elastic member of the coupling means is mainly subjected to tangential stress which facilitates the angular displacement of the shafts and thereby reduces the forces on the bearings, which are less high than when the elastic members are subjected to a one-sided compression in the direction of the axis of the shafts.

By suitably designing and shaping the coupling members and the elastic member connecting the same, it is possible to obtain substantially the same stresses in the elastic member in its inner and peripheral outer portions.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 1 is a schematic plan view illustrating the front half of a drive bogie in accordance with the invention provided with curved coupling members; and FIG. 2 is a schematic plan view illustrating the rear half of a drive bogie according to the invention provided with frustoconical coupling members.

DESCRIPTION OF THE PREFERRED EMBODIMENT

FIGS. 1 and 2 together may be considered as the plan view of a drive bogie. However, since the coupling means 5, 6, 7, and the coupling means 5', 6', 7' are differently constructed in accordance with modifications of the invention, FIGS. 1 and 2 are separated. Corresponding parts in FIGS. 1 and 2 are indicated by like reference numerals, provided with a prime in FIG. 2.

A motor 1, whose axis extends in longitudinal direction of the rails, has front supporting means 2 and rear supporting means 2'. Motor shaft means including a flexible gear coupling 1a, and a shaft portion 10, mounted in bearings 2b, are connected by a bevel gear 10a with a bevel gear 3a which is fixed to a hollow front shaft 3. The wheel shaft 4 of a wheel set 9 passes through the hollow shaft 3, and is movable relative to the same. Hollow shaft 3 is mounted in bearings 2a of supporting means 2. The ends of hollow shaft 3 are secured at 3b to first inner coupling members 5 which are curved and outwardly convex in opposite directions. Second outer coupling members 6, having surfaces 6a which are concave toward each other and toward the coupling members 5, are secured to the end portions of wheel shaft 4 which project beyond the ends of hollow shaft 3. The curvature of coupling members 5 and 6 matches so that the same are parallel. Between coupling members 5 and 6, an elastic annular member 7 preferably consisting of rubber, is disposed which is secured to the confronting faces of coupling members 6 and 5 by vulcanization. The elastic members 7 are pretensioned in axial direction.

The rear part of the drive bogie shown in FIG. 2 is constructed as explained above, the only difference being that the inner coupling members 5' are frustoconical and outwardly convex, while the outer coupling members 6' are also frustoconical and inwardly concave so that elastic members 5' are of uniform thickness. Elastic members 5' are vulcanized to the confronting faces of coupling members 5' and 6'.

Motor 1 with front support means 2 and rear support means 2', the angular transmissions, and the hollow shafts 3, 3', rests on the wheel shafts 4, 4' which respectively pass through the hollow shafts 3, 3'. The weight of the motor structure is taken up by the elastic members 5 and 5' which, due to the dishing of the outer coupling members 6, 6', are subjected to radial compression rather than to shearing forces. Also, angular displacement between shafts 4, 4' and hollow shafts 3, 3' respectively, is taken up by the elastic members 7, 7' which are tangentially stressed, and not subjected to one-sided pressure, as in constructions of the prior art.

It will be understood that ordinarily the front and rear parts of the drive bogie will be provided either both with coupling means 6, 5, 7 or both with coupling means 6', 5', 7', and that the arrangement shown in the drawing serves the purpose of illustrating two modifications of the elastic coupling means.

It will be understood that each of the elements described above, or two or more together, may also find a useful application in other types of drive bogies differing from the types described above.

While the invention has been illustrated and described as embodied in a wheel set drive provided with dished elastic couplings, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. Wheel set drive comprising, in combination, motor means including a motor, front and rear supporting means secured to said motor, and motor shaft means mounted on said front and rear supporting means for rotation about a first axis; a hollow front shaft and a hollow rear shaft mounted in said front and rear supporting means, respectively, for rotation about parallel horizontal second axes transverse to said first axes; front and rear transmission means connecting said motor shaft means with said hollow front shaft and said hollow rear shaft, respectively, for driving the same; a front wheel set including a pair of front wheels, and a front wheel shaft mounted in said hollow front shaft for relative movement and having end portions projecting from the ends of said hollow front shaft and supporting said front wheels, respectively, spaced from said ends of said hollow front shaft; a rear wheel set including a pair of rear wheels, and a rear wheel shaft mounted in said hollow rear shaft for relative movement and having end portions projecting from the ends of said hollow rear shaft and supporting said rear wheels, respectively, spaced from said ends of said hollow rear shaft; two front coupling means for connecting two ends of said hollow front shaft with said end portions of said front wheel shaft, respectively, each front coupling means including two first coupling members secured to the ends of said hollow front shaft, two second front coupling members secured to said end portions of said front wheel shaft, and two elastic members secured to and connecting said first and second front coupling members of each front coupling means; two rear coupling means for connecting said two ends of said hollow rear shaft with said end portions of said rear wheel shaft, respectively, each rear coupling means including two first rear coupling members secured to the ends of said hollow rear shaft, two second rear coupling members secured to said end portions of said rear wheel shaft, and two elastic members secured to and connecting said first and second rear coupling members of each rear coupling means so that said motor means drives said wheels while the entire weight of said motor means, transmission means, and hollow shafts rests through said front and rear coupling means on said front and rear wheel shafts, said second front and rear coupling members having surfaces dished and concave toward the respective first front and rear coupling members so that vertical forces caused by said weight and displacing said hollow shafts and first coupling members relative to said wheel shafts and said surfaces of said second coupling members cause radial compression of said elastic members on said dished concave surfaces of said second front and rear coupling members whereby the thickness of said elastic members between said front and rear coupling members is varied, and so that angular displacement of said hollow front and rear shafts with said first front and rear coupling members relative to said front and rear wheel shafts with said second front and rear coupling members stress said elastic members mainly in tangential direction along said surfaces.

2. Wheel set drive as claimed in claim 1 wherein said dished concave surfaces of said second coupling members are curved concave surfaces.

3. Wheel set drive as claimed in claim 1 wherein said dished concave surfaces of said second coupling members are frustoconical surfaces.

4. Wheel set drive as claimed in claim 1 wherein said first front and rear coupling members of the same coupling means are convex toward the respective dished concave surfaces of said second coupling members.

5. Wheel set drive as claimed in claim 4 wherein said convex first front and rear coupling members and said dished concave second front and rear coupling members of the same coupling means, respectively, have matching convex and concave confronting surfaces which are substantially parallel to each other so that said elastic members have substantially uniform thickness.

6. Wheel set drive as claimed in claim 5 wherein said matching convex and concave surfaces are curved at substantially the same radius of curvature.

7. Wheel set drive as claimed in claim 5 wherein said matching convex and concave surfaces are frustoconical.